United States Patent [19]

Lindemann

[11] 4,219,455
[45] * Aug. 26, 1980

[54] VINYL ESTER COPOLYMER AQUEOUS EMULSION WOOD ADHESIVE

[75] Inventor: Martin K. Lindemann, Greenville, S.C.

[73] Assignee: Chas. S. Tanner Co., Greenville, S.C.

[*] Notice: The portion of the term of this patent subsequent to Sep. 19, 1995, has been disclaimed.

[21] Appl. No.: 943,142

[22] Filed: Sep. 18, 1978

Related U.S. Application Data

[63] Continuation-in-part of Ser. No. 853,993, Nov. 25, 1977, Pat. No. 4,115,306.

[51] Int. Cl.$^2$ ............................................. C08L 31/02
[52] U.S. Cl. .................. 260/29.6 WA; 260/29.6 H; 260/29.6 TA; 260/29.6 E
[58] Field of Search .................. 260/29.6 H, 29.6 TA, 260/29.6 WA, 29.6 E

[56] References Cited

U.S. PATENT DOCUMENTS

| | | | |
|---|---|---|---|
| 3,578,618 | 5/1971 | Beardsley | 260/29.6 TA |
| 3,632,787 | 1/1972 | Wilbur | 260/29.6 TA |
| 3,755,237 | 8/1973 | Isaacs | 260/29.6 TA |
| 3,763,073 | 10/1973 | Knutson | 260/29.6 R |
| 3,950,294 | 4/1976 | Connelly | 260/29.6 TA |
| 4,035,329 | 7/1977 | Wiest | 260/29.6 WA |
| 4,118,356 | 10/1978 | Devona | 260/29.6 TA |

*Primary Examiner*—Paul R. Michl
*Attorney, Agent, or Firm*—Dressler, Goldsmith, Shore, Sutker & Milnamow, Ltd.

[57] ABSTRACT

Vinyl ester copolymer aqueous emulsion wood adhesives are provided using an emulsion copolymer having a $T_g$ of at least 10° C. and containing at least 80% of vinyl ester and from 0.2–6% of monomer containing the

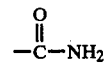

group, the monomers being emulsified during copolymerization by from 0.5 to 10% of hydroxy functional protective colloid to provide particles having an average particle size in excess of 0.3 micron, and at least 3% of plasticizer is incorporated in the emulsion to insure room temperature coalescence.

9 Claims, No Drawings

VINYL ESTER COPOLYMER AQUEOUS EMULSION WOOD ADHESIVE

The present application is a continuation-in-part of my prior application Ser. No. 853,993, filed Nov. 25, 1977, now U.S. Pat. No. 4,115,306, granted Sept. 19, 1978.

DESCRIPTION

1. Technical Field

The present invention relates to vinyl ester copolymer aqueous emulsion wood adhesives which develop improved bond strength adhesion. Copolymers consisting essentially of vinyl acetate with less than 6% of monomer containing the

group are particularly contemplated.

In the aqueous emulsion adhesives under consideration, the adhesive characteristic is supplied by the combination of an emulsion copolymer stabilized in the emulsion by an hydroxy functional protective colloid, especially polyvinyl alcohol or hydroxy ethyl cellulose, as the essential agents stabilizing the emulsion. Specifically, anionic and nonionic surfactants should not be present as the primary emulsifier, though small amounts of such agents for ancillary purpose, such as reducing surface tension, may be used.

2. Background Art

Adhesives of the type under consideration are known, as illustrated for example in U.S. Pat. No. 3,708,388, in which I am a coinventor. However, these prior adhesives lack good resistance to cold flow, and the adhesion to substrates such as treated polyethylene is poor, which limits the utility of the adhesive. Also, urea formaldehyde condensates have been added to improve cold flow resistance, but residual formaldehyde can create objection.

In U.S. Pat. No. 3,708,388 it was found that when monomers providing thermosetting capacity were present, instead of protective colloids, such as polyvinyl alcohol or hydroxy ethyl cellulose, that the adhesive quality was impaired. Further, if monomers providing thermosetting capacity are present during the emulsion copolymerization, together with the hydroxy functional protective colloid, then it is found that the curing reaction between the N-methylol group and the hydroxy group takes place during the polymerization. This produces excessive emulsion viscosities and, at times, produces a cheesy or gel-like emulsion which is useless.

In order to overcome this difficulty, I included in the copolymer a small proportion of a monomer carrying an N-methylol group which had been etherified, and especially an etherified N-methylol allyl carbamate. These etherified monomers, for a variety of reasons, copolymerized without premature reaction with the hydroxy groups of the hydroxy functional protective colloid so that excessive viscosity in the aqueous emulsion is avoided at the same time that the curing potential is retained. This contribution is the subject of my U.S. Pat. No. 3,941,735 issued Mar. 2, 1976.

While the use of etherified N-methylol functional reactive monomers, as illustrated in U.S. Pat. No. 3,941,735, represents a significant improvement, there are some disadvantages. First, instead of using an easily available monomer, one must methylolate the monomer and then etherify it, and each step in the chain adds cost. Also, N-methylol ethers are subject to transetherification, and this is itself a source of undesired premature crosslinking.

From the standpoint of copolymers of vinyl ester and monomer containing the

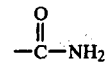

group, emulsion copolymers of acrylamide and vinyl acetate have previously been proposed for use in wood adhesives (see British Pat. No. 1,092,030). However, this patent does not use hydroxy functional protective colloid so the particle size obtained is very small. Also, the proportion of acrylamide, which is highly soluble in water and poorly soluble in vinyl acetate, is excessive so excessive viscosity results and the product is not a practical wood adhesive.

Disclosure of Invention

In accordance with this invention, a vinyl ester copolymer aqueous emulsion wood adhesive is provided by employing a vinyl ester emulsion copolymer containing from 0.2%–6% by weight of monomer containing the

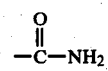

group and formed by copolymerization in the presence of hydroxy functional protective colloid as the essential agent stabilizing the emulsion to provide emulsion copolymer particles having an average particle size in excess of 0.3 micron. This emulsion copolymer contains at least 80% by weight of copolymerized vinyl ester, and has a $T_g$ of at least 10° C., preferably at least 20° C.

The monomers providing the

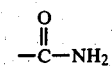

group are preferably carbamates, as disclosed in my copending application Ser. No. 853,993, filed Nov. 25, 1977 now U.S. Pat. No. 4,115,306, granted Sept. 19, 1978. These are illustrated by allyl carbamate and methallyl carbamate which can be used as such, or the allyl or methallyl alcohol can be reacted with an alkylene oxide before converting the resulting alcohol to the carbamate as more fully explained in said application Ser. No. 853,993. Monoethylenic amides, such as acrylamide or the other amides described in my companion application filed of even data herewith, can also be used. However, these are more soluble in water and less soluble in the vinyl ester, so proportions in excess of 2% are difficult to use without encountering excessive viscosity.

Preferred proportions of the monomer providing the

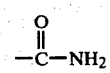

group are from 0.5–1.2% of the weight of the copolymer since this provides a marked increase in bond strength with little increase in viscosity. However, in some instances, especially to maximize water resistance where vinyl acetate copolymer emulsion wood adhesives are notoriously poor, it is desired to increase the proportion of monomer providing the

group into the range of 2–6%, and this can be done using methallyl carbamate.

Referring more particularly to the hydroxy functional protective colloid, these have been illustrated hereinbefore and are employed in an amount of about 0.05 to 10%, preferably from 0.1 to 5%, and most preferably from 0.5–2.5%, based on the total weight of the latex.

The vinyl ester which is used is preferably vinyl acetate, but all of the vinyl esters with saturated aliphatic monocarboxylic acids are useful, vinyl propionate, vinyl stearate and vinyl versatate further illustrating the class under consideration. At least 80%, preferably at least 90% of the copolymer, will consist of vinyl ester, preferably vinyl acetate. With such a large proportion of vinyl ester present, the $T_g$ (glass transition temperature) will normally be above 10° C., but other copolymerizable monoethylenic monomers may be present, such as vinyl benzoate, vinyl chloride, and vinylidene chloride.

Reactive monomers, other than the monomer providing the

group, which may be present are illustrated by allyl alcohol, 2-hydroxy ethyl acrylate or methacrylate, or the like, or monomers providing the carboxyl group. Monoethylenic carboxylic acids are illustrated by acrylic, methacrylic, crotonic or itaconic acids, or the like. Sulphonic acids, or their salts, such as 2-sulpho ethyl methacrylate or sodium vinyl sulphonate are also useful.

The plasticizers which are used herein are water insoluble, oily liquids which are added to the aqueous emulsion of copolymer particles and which are absorbed into these particles. The plasticizers provide various properties, but primarily they assist coalescence of the high $T_g$ copolymer at room temperature and serve to increase the tackiness of the deposited adhesive film. Dibutyl phthalate is representative of this known class of materials and will be used as illustrative. Phenol also serves as a plasticizer, and it will be used in the examples to provide part of the plasticizer because it provides fungicidal or antimicrobial characteristics to the adhesive, though this is not a feature of the invention.

Plasticizer proportions can vary considerably, but are usually used in an amount of at least 3% of the weight of the copolymer to insure room temperature coalescence. Excess plasticizer tends to soften the copolymer, and since bond strength increases with increasing copolymer hardness, the plasticizer content is minimized.

If the proportion of polyvinyl alcohol or other hydroxy colloid is inadequate, more can be added to the emulsion adhesive. A proportion of from 5% to 40% of the hydroxy colloid, based on the weight of the copolymer, is desirably present.

Auxiliary agents such as pigments, fillers, dyes, flow control agents, volatile solvents, and the like may be present, but these are conventional.

The emulsion copolymerization is a conventional one and the details thereof form no part of this invention except that the polymerization is carried out in an aqueous acidic environment having a ph of about 5.7 or lower, preferably in the range of 4.5–5.8. This is conveniently done by adding a small amount of an acid which is preferably a mineral acid such as hydrochloric acid or phosphoric acid. Sodium benzoate or sodium bicarbonate can be added as a buffer. The final emulsion is also acidic, usually pH about 4–5, but this is not essential, and a pH of 3.5–6.5 is permissible.

BEST MODE FOR CARRYING OUT THE INVENTION

Example 1

The following is charged to a 1-gallon stainless steel polymerization reactor equipped with temperature controls and an agitator:

| Component | Grams |
| --- | --- |
| Water | 1100 |
| Polyvinyl alcohol (Note 1) | 43 |
| Polyvinyl alcohol (Note 2) | 10 |
| Seed Latex (Previously prepared - See Note 1) | 74 |
| Sodium Formaldehyde Sulfoxylate | 5 |
| Sodium Benzoate | 0.4 |
| Ferrous Sulfate | 0.02 |
| Vinyl Acetate | 1400 |
| Allyl carbamate | 7 |

Water and the polyvinyl alcohols are first charged to the reactor and agitated at 50° C. until completely dissolved before the remaining ingredients are charged.

The pH of the monomer emulsion is adjusted to 4.6 with 2 cc. of 18% HCl, and the temperature raised to 60° C. at which point a catalyst solution prepared as shown below is introduced drop wise over 4 hours to maintain the reaction.

| Catalyst Solution | |
| --- | --- |
| Component | Grams |
| Water | 66 |
| Sodium Benzoate | 5 |
| Hydrogen Peroxide (35% $H_2O_2$ in water) | 29 |

A total of 40 cc. of the above catalyst solution was used to complete the reaction.

Periodic additions of a 15% solution of sodium formaldehyde sulfoxylate were made to maintain a reducing environment until a total of 16 cc's had been added.

The reaction is carried out at the minimum reflux temperature, (69°–74° C.). The reaction is completed with the addition of 2 cc's of tertiary butyl hydroperoxide when the unreacted monomer was reduced to about 2%, and this lowers the unreacted monomer content to about 0.5%.

Note 1—the seed latex is a commercially produced polyvinyl acetate latex with particle size of 0.15 micron (any latex having the same particle size may be substituted).

The final latex product has the following properties:
An emulsion having the following properties is obtained:
 Solids content=55.8%
 Brookfield Viscosity (60 RPM-#4 spindle)=650 cps.
 Insolubility in trichloroethylene (12 hr. air dry)=64%
 Intrinsic Viscosity (dimethyl formamide)=1.56 (dl/g)
 $T_g$ (differential thermal calorimetry) =31° C.

EXAMPLE 2

33 grams of dibutyl phthalate and 16 grams of phenol were stirred together until the phenol dissolved. To this mixture was added 2000 grams of the polyvinyl acetate copolymer emulsion of Example 1, and 200 grams of a 15% solution of polyvinyl alcohol, (87% hydrolyzed and of high molecular weight) [Gelvatol 20-90 may be used], and the mixture was stirred to cause the copolymer emulsion to absorb the plasticizers and form a wood adhesive.

This adhesive is tested as follows:
Two maple blocks ¼ inch thick are glued together, the glued surface having an area of 1 square inch. Immediately after gluing, the blocks are placed in a jig press at 200 psi for 15 minutes, and then allowed to stand overnight. The samples are then pulled apart on an Instron Tensile Tester with a draw speed of 2 inches per minute. The wood adhesive of this example shows 740 pounds of pull at failure. A control using a commercial polyvinyl acetate polymer emulsion (Duroset H 100 of Chas. S. Tanner Co.) in the same adhesive formula showed only 560 pounds of pull at failure. The small amount of monomer providing the

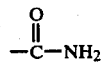

group provided a sizeable improvement.

What is claimed is:

1. Vinyl ester copolymer aqueous emulsion wood adhesive comprising water having emulsified therein an aqueous emulsion copolymer of monoethylenic monomers having a $T_g$ of at least 10° C. and consisting essentially of at least 80% by weight of the copolymer of vinyl acetate, from 0.2% to 6% by weight of the copolymer of allyl or methallyl carbamate, and any balance of said copolymer being monoethylenic monomers copolymerizable with said vinyl acetate and nonreactive with hydroxy during emulsion copolymerization, the monomers of said copolymer being emulsified during copolymerization by from 0.5% to 10% of a polyvinyl alcohol protective colloid to provide copolymer particles having an average particle size in excess of 0.3 micron, and at least 3% by weight of water insoluble liquid plasticizer for said copolymer, based on the weight of the copolymer, to insure room temperature coalescence.

2. A wood adhesive as recited in claim 1 in which additional polyvinyl alcohol is added after copolymerization to provide, in the adhesive, an amount of from 5% to 40% of polyvinyl alcohol based on the weight of the copolymer.

3. A wood adhesive as recited in claim 1 in which said protective colloid is polyvinyl acetate partially hydrolyzed to about 88%.

4. A wood adhesive as recited in claim 3 in which vinyl acetate constitutes at least 90% of the weight of the copolymer and said copolymer has a $T_g$ above 20° C.

5. A wood adhesive as recited in any of claims 1-4 in which said carbamate is allyl carbamate and is present in said copolymer in an amount of 0.5% to 1.2%, by weight.

6. A wood adhesive as recited in any of claims 1-4 in which said carbamate is methallyl carbamate and is present in said copolymer in an amount of 2% to 6%, by weight.

7. A wood adhesive as recited in claim 1 in which said emulsion has a pH in the range of 3.5 to 6.5.

8. A wood adhesive as recited in claim 1 in which said plasticizer comprises dibutyl phthalate.

9. A wood adhesive as recited in claim 8 in which said plasticizer further comprises phenol.

* * * * *

UNITED STATES PATENT OFFICE
CERTIFICATE OF CORRECTION

Patent No. 4,219,455   Dated Aug. 26, 1980

Inventor(s) Martin K. Lindemann

It is certified that error appears in the above-identified patent and that said Letters Patent are hereby corrected as shown below:

Col. 4, after line 37 add:

Note 1 - polyvinyl acetate 88% hydrolyzed (4% solids aqueous solution has a viscosity of 5 centipoise). The commercial product Gelvatol 20-30 may be used.

Note 2 - polyvinyl acetate 88% hydrolyzed (4% solids aqueous solution has a viscosity of 22 centipoise). The commercial product Gelvatol 20-60 may be used. The Gelvatol products are supplied by Shawinigan Resins Corp., Springfield, Mass.

Signed and Sealed this

Third Day of November 1981

[SEAL]

Attest:

GERALD J. MOSSINGHOFF

Attesting Officer   Commissioner of Patents and Trademarks